United States Patent
Seon (10) Patent No.: US 7,587,213 B2
(45) Date of Patent: Sep. 8, 2009

(54) APPARATUS AND A METHOD FOR CONTROLLING A PRIORITY ACCESS AND CHANNEL ASSIGNMENT CALL IN A MOBILE TELECOMMUNICATION SYSTEM

(75) Inventor: Yong-Moon Seon, Songnam-shi (KR)

(73) Assignee: Samsung Electronics Co., Ltd. (KR)

(*) Notice: Subject to any disclaimer, the term of this patent is extended or adjusted under 35 U.S.C. 154(b) by 0 days.

(21) Appl. No.: 10/852,505

(22) Filed: May 24, 2004

(65) Prior Publication Data

US 2004/0214589 A1 Oct. 28, 2004

Related U.S. Application Data

(62) Division of application No. 09/847,001, filed on May 1, 2001, now abandoned.

(30) Foreign Application Priority Data

Jun. 1, 2000 (KR) ............................... 2000-30012

(51) Int. Cl.
 H04Q 7/20 (2006.01)
 H04B 7/00 (2006.01)
(52) U.S. Cl. ..................... 455/512; 455/515; 455/435.2; 455/509
(58) Field of Classification Search ................ 455/512, 455/453, 450, 436, 574, 509, 433, 452.1, 455/414.1, 414.3, 455, 451, 442, 438, 435.1–435.3, 455/432.1–432.3, 458, 515, 420, 517, 415, 455/513, 516

See application file for complete search history.

(56) References Cited

U.S. PATENT DOCUMENTS

| | | | | |
|---|---|---|---|---|
| 5,574,977 A * | 11/1996 | Joseph et al. | ................ | 455/450 |
| 5,794,156 A * | 8/1998 | Alanara | ....................... | 455/517 |
| 5,915,220 A * | 6/1999 | Chelliah | ................... | 455/435.2 |
| 6,067,457 A * | 5/2000 | Erickson et al. | ............. | 455/512 |
| 6,072,987 A * | 6/2000 | Willey | ........................ | 455/574 |
| 6,549,787 B1 | 4/2003 | Ravi | | |
| 6,597,920 B2 * | 7/2003 | Yegani et al. | ................ | 455/512 |
| 6,760,594 B1 | 7/2004 | Murasawa et al. | | |
| 2002/0142776 A1 * | 10/2002 | Tiedemann, Jr. | ............. | 455/450 |
| 2004/0071113 A1 * | 4/2004 | Tiedemann, Jr. | ............. | 370/331 |

FOREIGN PATENT DOCUMENTS

WO  WO 00/11879  3/2000

* cited by examiner

*Primary Examiner*—John J Lee
(74) *Attorney, Agent, or Firm*—The Farrell Law Firm, LLP (57) ABSTRACT

Disclosed is a method for controlling a PACA call in a mobile telecommunications system, which comprises: sending a new origination message from a mobile station in a PACA state to a base station; sending a service request message for a PACA call from the base station to a mobile switching center; requesting from the mobile switching center the base station to assign a traffic channel to the mobile station; assigning an available traffic channel to the mobile station to start a communication; and distinguishing the PACA call service from an ordinary call service.

2 Claims, 8 Drawing Sheets

FIG. 8

APPARATUS AND A METHOD FOR CONTROLLING A PRIORITY ACCESS AND CHANNEL ASSIGNMENT CALL IN A MOBILE TELECOMMUNICATION SYSTEM

PRIORITY

This application is a Divisional of U.S. application Ser. No. 09/847,001, filed on May 1, 2001 now abandoned which claims priority to an application entitled "Method for Controlling a Priority Access and Channel Assignment Call in a Mobile Telecommunications System" filed in the Korean Industrial Property Office on Jun. 1, 2000 and assigned Serial No. 2000-30012, the contents of which are hereby incorporated by reference.

BACKGROUND OF THE INVENTION

1. Field of the Invention

The present invention relates to a mobile telecommunication system, and more particularly to an apparatus and a method for controlling a priority access and channel assignment call in a mobile telecommunication system.

2. Description of the Related Art

Generally, the priority access and channel assignment (PACA) call is a channel assignment service provided to a subscriber. PACA allows a subscriber to obtain communication priority, so that when a user requests a base station (BS) make a call to a mobile station that is presently not available because its traffic channel is receiving too much traffic then the mobile station (MS) switches to a standby mode so that it may be assigned to the traffic channel when the traffic channel is idle and available. Here, the standby mode of the MS is defined as the "PACA state", which is described in connection with FIGS. 1 and 2.

Figure 1:
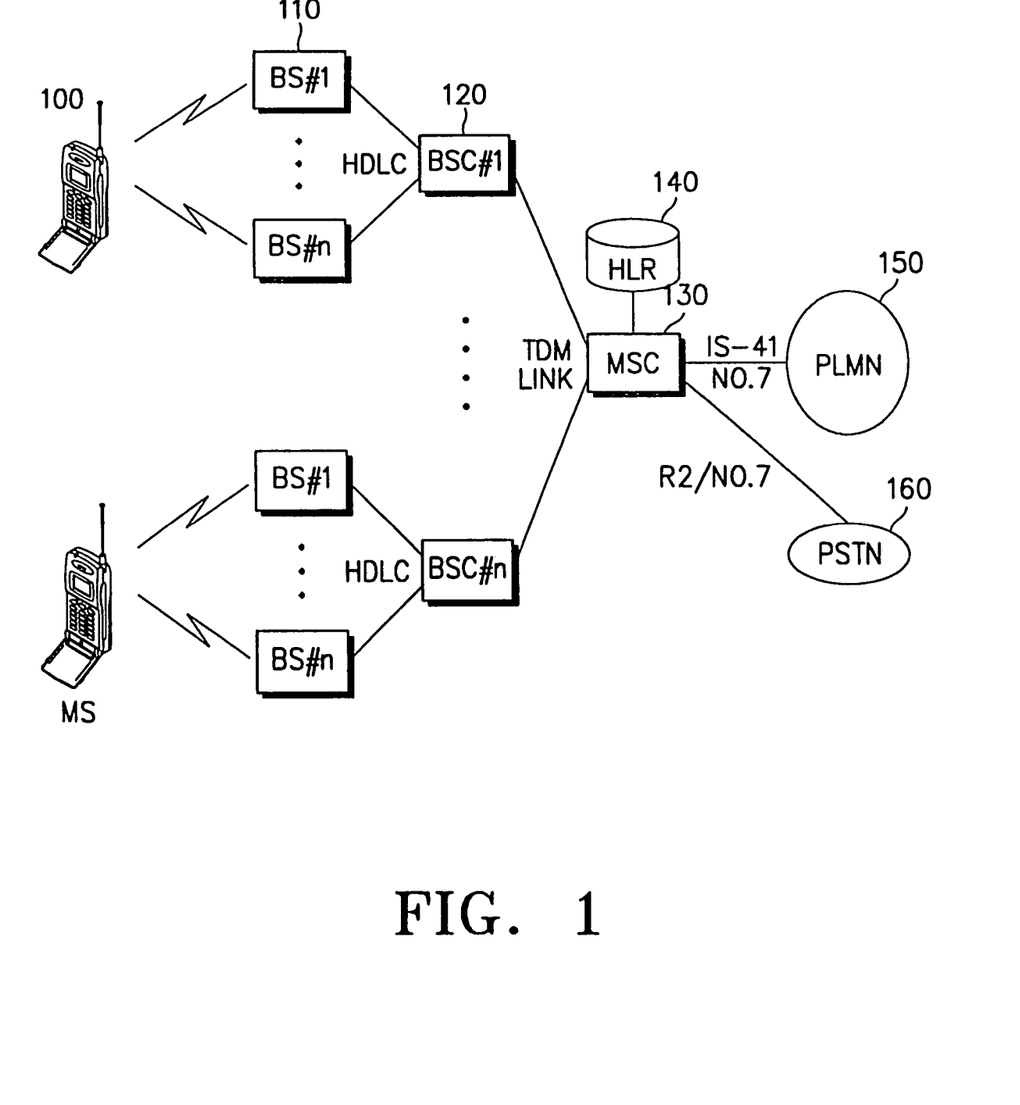
FIG. 1 illustrates a schematic diagram that depicts the structure of a conventional mobile communication system.

Referring to FIG. 1 there is illustrated a schematic diagram of a conventional mobile telecommunication system. It consists of a Public Switch Telecommunications Network (PSTN) 160, a Public Land Mobile Network (PLMN) 150, a mobile switching center (MSC) 130, a home location register (HLR) 140, a base station controller (BSC) 120, a base station (BS) 110, and an MS 100. MS 100 communicates with both PSTN 160 and PLMN 150. The BSC 120 performs both wired and wireless link control and hand-off. The BS 110 provides the wireless traffic channel to MS 100, which manages wireless traffic resources. The HLR 140 registers the subscriber's location, although, not shown, the visitor location register (VLR) does the same function.

Figure 2:
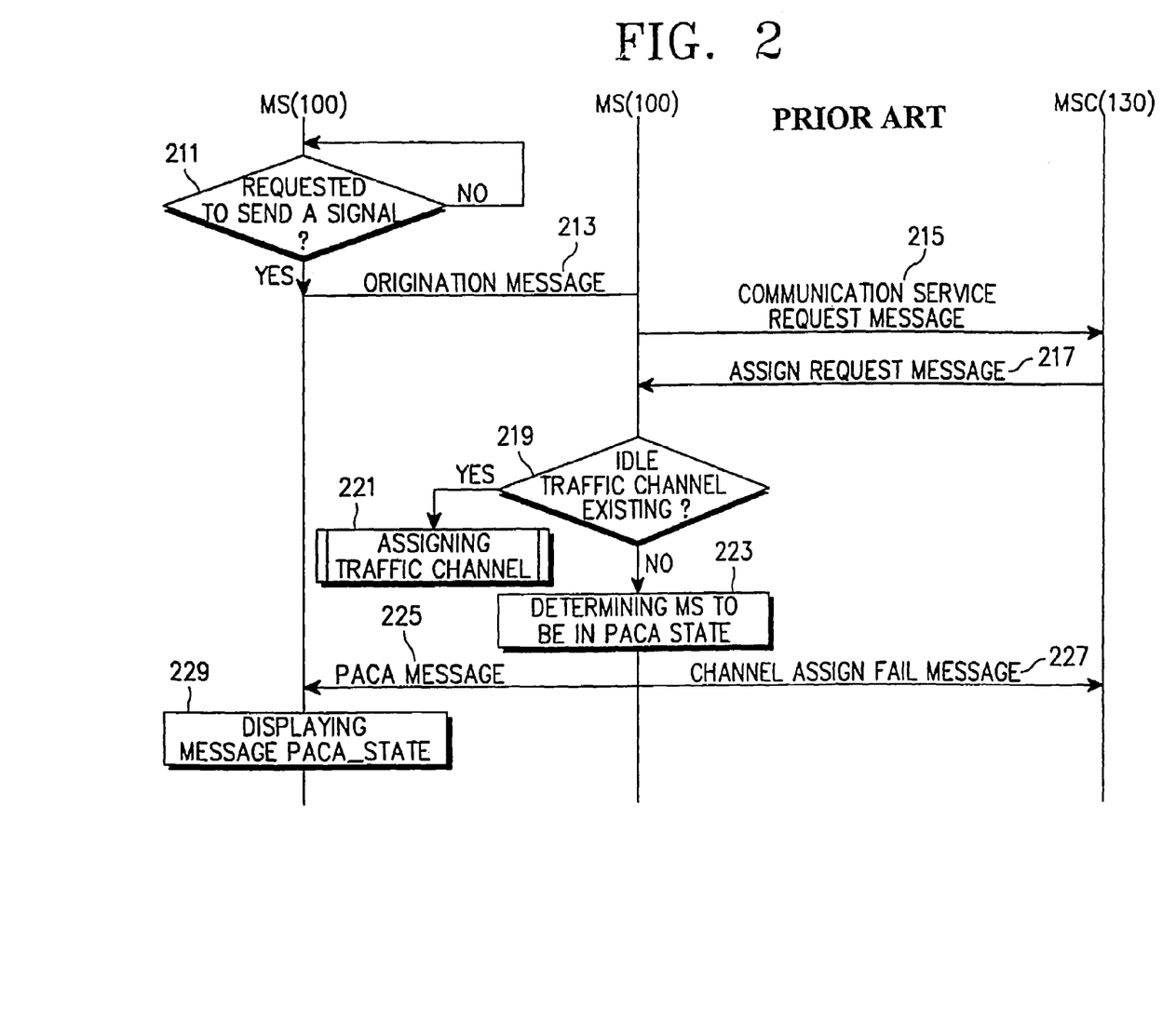
FIG. 2 illustrates a flow diagram that depicts the process of shifting an MS to the PACA state, according to the conventional method.

In FIG. 2, there is illustrated a flow diagram that depicts a conventional process for shifting the MS to the PACA state. MS 100 is requested by the user to send a signal in step 211. If MS 100 does not request a signal be sent, then the signal stays at MS 100. In step 213, if MS 100 requests a signal be sent, MS 100 transmits an origination message to BS 110. BS 110 sends the signal as a call service request message "CM_SERVICE," REQ to MSC 130, in step 215. Then, if MSC 130 sends an assign request message, "ASSIGN REQ" to BS 110 to assign a traffic channel for the origination message, in step 217, the BS 110 detects an available or idle traffic channel, in step 219. If there exists an idle traffic channel, the BS 110 assigns it to the MS 100, in step 221. However, if there is no idle traffic channel, the BS 110 places the MS 100 in the PACA state. Then BS 110, sends a PACA message to the MS 100, in step 225, while it also sends a channel assign fail message, "CH_ASSIGN_FAIL" which represents failure in the attempt to assign a traffic channel to the MSC 130, in step 227.

Meanwhile, the MS 100 receives the PACA display message that states, "PACA-State" which informs the user, in step 229, that the MS 100 has been shifted to the "PACA-State." As previously stated, the PACA state indicates that the BS 110 cannot assign an available traffic channel, with a communication priority, to the MS 100 because there is no available channel. MS 100 is placed on a standby mode for a predetermined time, for example 1 minute, to periodically re-send the origination signal, until the BS 110 detects an idle traffic channel assigned to the MS. In this case, the BS 110 determines whether the MS 100 has the communication priority or not, based on the subscriber's information of the MS 100 contained in the assign request message received from the MSC 130. Thus, if an idle traffic channel occurs in the BS 110, the MS 100 is immediately connected to it from the PACA state to establish a communication channel.

However, the aforementioned conventional method does not provide the MSC 130 a method to distinguish when the MS 100 has been assigned to a traffic channel during the PACA state from the MS 100 that has been assigned to a traffic channel through the ordinary assignment process, especially in charging the subscriber. In addition, when the MS 100 is handed off from one BS to another, the former BS unnecessarily stores the subscriber's information of the MS 100, thereby increasing consumption of the resources. Moreover, when the MS 100 re-sends the origination signal in the PACA state, the subscriber's information is additionally stored and maintained in the BS, which also increases consumption of the resources as in handoff.

Therefore, a need exists for an apparatus and method that can be utilized to distinguish the MS that has been assigned to a traffic channel during the PACA state from the MS that has been assigned a traffic channel through an ordinary assignment process. In addition, there exists a need for an apparatus and method that does not store a subscriber's information of a MS.

SUMMARY OF THE INVENTION

It is an object of the present invention to provide a method for controlling a PACA call in a mobile telecommunication system, which may distinguish the PACA call from the ordinary call in charging the communications services.

It is another object of the present invention to provide a method for controlling a PACA call in a mobile telecommunication system, which may delete the PACA call information from the BS from which the MS is handed off to a new BS, thereby improving the storage efficiency of the PACA buffer.

It is still another object of the present invention to provide a method for controlling a PACA call in a mobile telecommunication system, which may delete the PACA call information previously stored in the BS when the MS in the PACA state, sends a new origination signal which is received and stored by the BS.

It is still another object of the present invention to provide a method for controlling a PACA call in a mobile telecommunication system, which may delete the PACA call information stored in the BS when the MS deletes it, thereby improving the storage efficiency of the PACA buffer.

It is yet another object of the present invention to provide a method for controlling a PACA call in a mobile telecommunication system, which may send a busy tone signal to a caller who has sent a call signal to the MS in the PACA state without requesting the MS to receive it.

According to the present invention, a method for controlling a PACA call in a mobile telecommunication system, comprises: sending a new origination message from a mobile station in the PACA state to a base station; sending a service request message for the PACA call from the base station to a mobile switching center; requesting from the mobile switching center that the base station assign a traffic channel to the mobile station; assigning an available traffic channel to the mobile station to start a communication; and distinguishing the PACA call service from an ordinary call service.

The present invention will now be described more specifically with reference to the drawings attached only by way of example.

BRIEF DESCRIPTION OF THE DRAWINGS

The above and other objects, features, and advantages of the present invention will become more apparent in light of the following detailed description of an exemplary embodiment thereof taken in conjunction with the attached drawings in which.

DETAILED DESCRIPTION OF THE PREFERRED EMBODIMENT

Throughout the description, in connection with the drawings, there are omitted detailed descriptions of the conventional parts not required to comprehend the technical concept of the present invention. The terms used in this specification are only to help understand descriptions of the essential functions connected with the invention, and should be interpreted based on the meaning the whole specification intends to convey including the attached claims.

Hereinafter described is the inventive system of controlling a PACA call in connection with FIGS. 1 and 3 to 7. There is a description of the first process of shifting, an MS to the, PACA state "PACA_STATE" and assigning a traffic channel thereto with reference to FIG. 3. e MS 100 is requested by the user to send a signal, in step 311, then it sends the signal in the form of an origination message to a BS 110, in step 313. Then, the BS 110 sends an acknowledge order message, "BS_ACK_ORDER_MSG" to the MS 100, in step 315, and a communication service request message "CM_SERVICE_REQ" to the MSC 130, in step 317. The MSC 130 sends a subscriber's information request message "MS_CgVSvcingRQ_Msg" to the HLR 140O/VLR (not shown) to request the subscriber's information of the MS 100, in step 319. The HLR/VLR retrieves the subscriber's information loaded on a subscriber's information response message, "MS_CgVSvc-ing" (PACA call flag) delivered to the MSC 130, in step 321.

Figure 3:
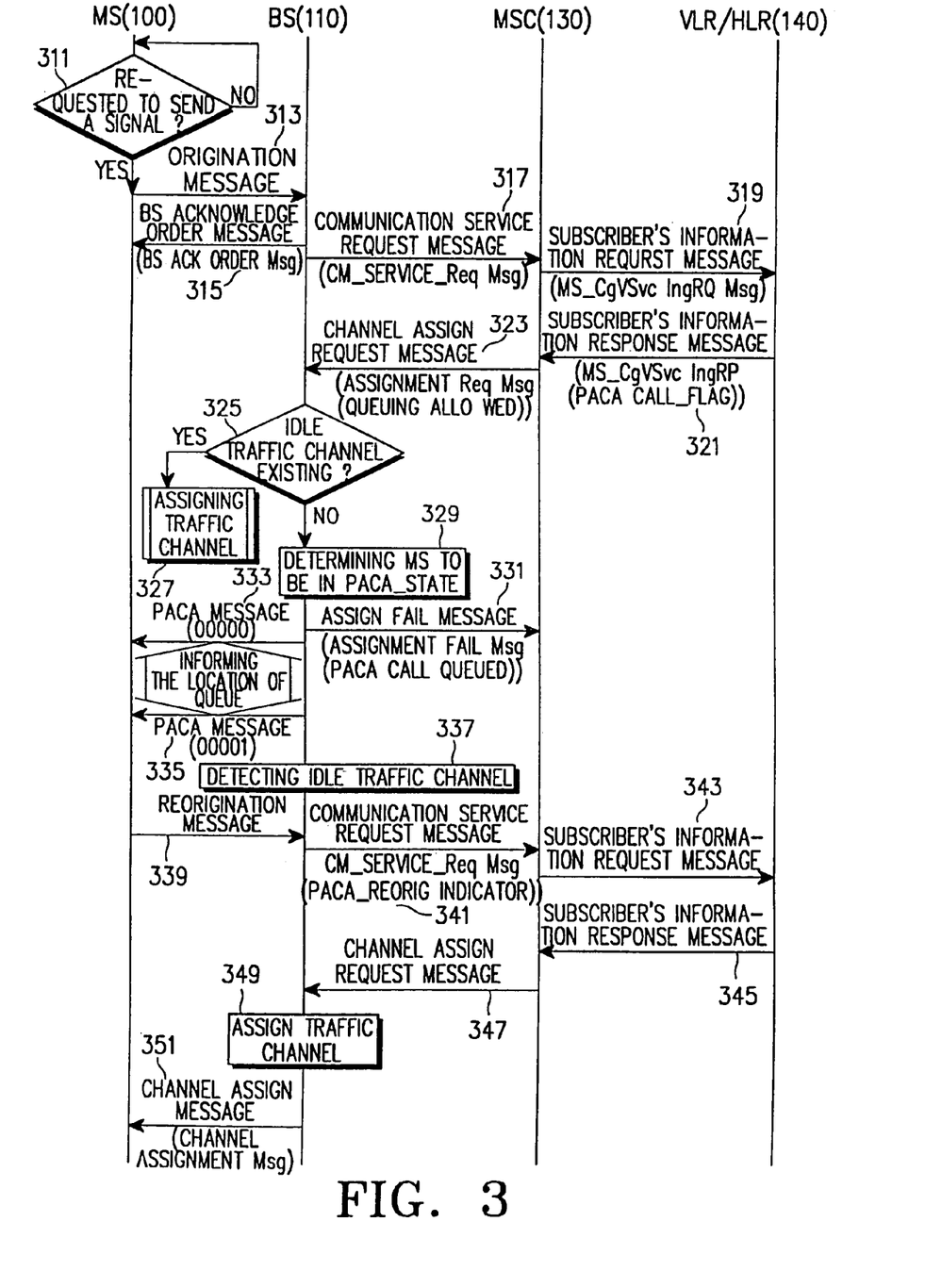
FIG. 3 illustrates a flow diagram that depicts shifting an MS to the PACA state and assigning a traffic channel thereto, according to the present invention.

In this case, the subscriber's information response message contains states, "PACA_Call_flag" which is set to have a predetermined value, for example 1 if the MS has priority for the PACA call. The MSC 130 receives the subscriber's information response message, then sends a channel assign request message, "ASSIGNMENT_REQ" to request the BS 110 assign a traffic channel to the MS 100, in step 323. The channel assign request message contains "queuing allowed" information to allow the PACA call because the subscriber's information represents priority for the PACA call. Then, the BS 110 detects, in step 325, if there is an available or idle traffic channel to be assigned to the MS 100 to have a normal communication, in step 327.

In this case, if there is no idle traffic channel, the BS 110 places the MS 100 in the PACA state "PACA_STATE," in step 329, then sends a channel assign fail message "Assignment_Fail" to the MSC 130, in step 331. The channel assign fail message states "PACA call queued" information, which shows that the MS 100 has been shifted to the PACA state "PACA_STATE," where information is stored in the PACA buffer of the BS 110. Although, not shown, the MSC 130 notifies the HLR 140VLR that the MS 100 is in the, PACA state "PACA_STATE." Meanwhile, the BS 110 stores the PACA call of the MS 100 in the PACA buffer, sending, in step 333, a PACA call storage message to the MS 100, which represents the address, for example, "00000" of the PACA call queue message stored in the PACA buffer. Whenever the address of the PACA call queue is changed, the BS 110 sends the PACA call storage message to inform the MS 100 of the changed address, for example "00001", in step 335. Subsequently, if the BS 110 detects an idle traffic channel, in step 337, the MS 100 is notified of it. Then, the MS 100 sends, in step 339, the reorigination message to the BS 110, which in turn sends a communication service request message "CM_SERVICE_REQ" to the MSC 130, in step 341. In this case, the communication service request message contains the PACA reorigination indicator "PACA_REORIG", which indicates that the reorigination message is a PACA call. The MSC 130, sends in step 343, the subscriber's information request message to the HLR 140/VLR, which, in turn, sends the subscriber's information response message to the MSC 130. Receiving the subscriber's information response message, the MSC 130 sends, in step 347, the channel assign request message to the BS 110 to assign a traffic channel for the reorigination message to the MS 100 in step 349. Then, the BS 110 sends the channel assignment message, "Channel_Assignment," in step 351. After the MS 100 has completed communication, the MSC 130 distinguishes the PACA call service from the ordinary call service in charging the subscriber based on the PACA reorigination indicator "PACA_REORIG" contained in the reorigination message.

Figure 4:
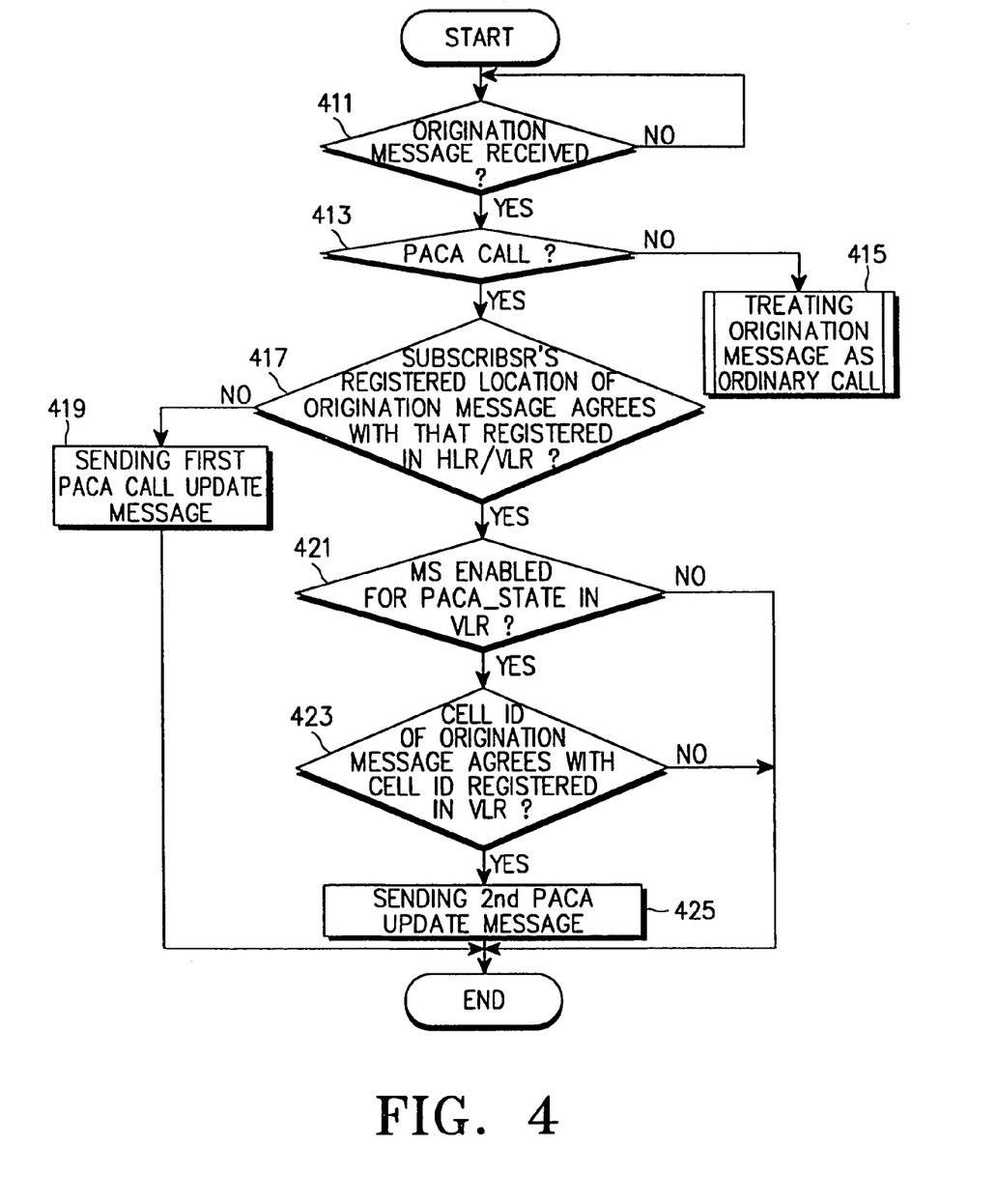
FIG. 4 illustrates a flow diagram that depicts updating the PACA call information of the MSC, according to the present invention.

The process of updating the PACA call in the MSC is described in connection with FIG. 4. Receiving an origination message, in step 411, the MSC 130 determines, in step 413, whether the origination message is the PACA call or not. If not, the MSC 130 treats it as the ordinary call in step 415.

However, if the origination message is indicative of the PACA call, then the MSC 130 requests the HLR 140/VLR to send the subscriber's information of the origination message, which is analyzed to determine, in step 417, whether the subscriber's registered location of the origination message agrees with the registration of the HLR/VLR or not. If they do not agree, the MSC 130 determines if the MS 100 has been handed off from the previous BS to a new BS, then sends a first PACA call update message to the previous BS. The first PACA call update message requests the previous BS delete the PACA call information from the PACA buffer because the previous BS need not deal with it. The process of dealing with the PACA call concerning the handoff of the MS 100 will be described in connection with FIG. 5.

Meanwhile, if the subscriber's registered location of the origination message agrees with the origination message registered in HLR/VLR, then the MSC 130 determines whether the MS 100 is enabled for the "PACA_STATE" in HLR 140/VLR, in step 421. If the MS is enabled for the PACA state, the MSC 130 determines, in step 423, whether the cell ID of the origination message agrees with the origination message registered in HLR/VLR. If they agree, the MSC 130 determines that the MS has sent a new origination message in the PACA state, then sends a second PACA call update message to the base station in step 425. The second PACA call update message requests the BS 110 delete the previous PACA call stored in the PACA buffer because of the new origination message. The process of dealing with the new PACA call generated from the MS 100 in the PACA state "PACA_STATE" will be described in connection with FIG. 6.

Figure 5:
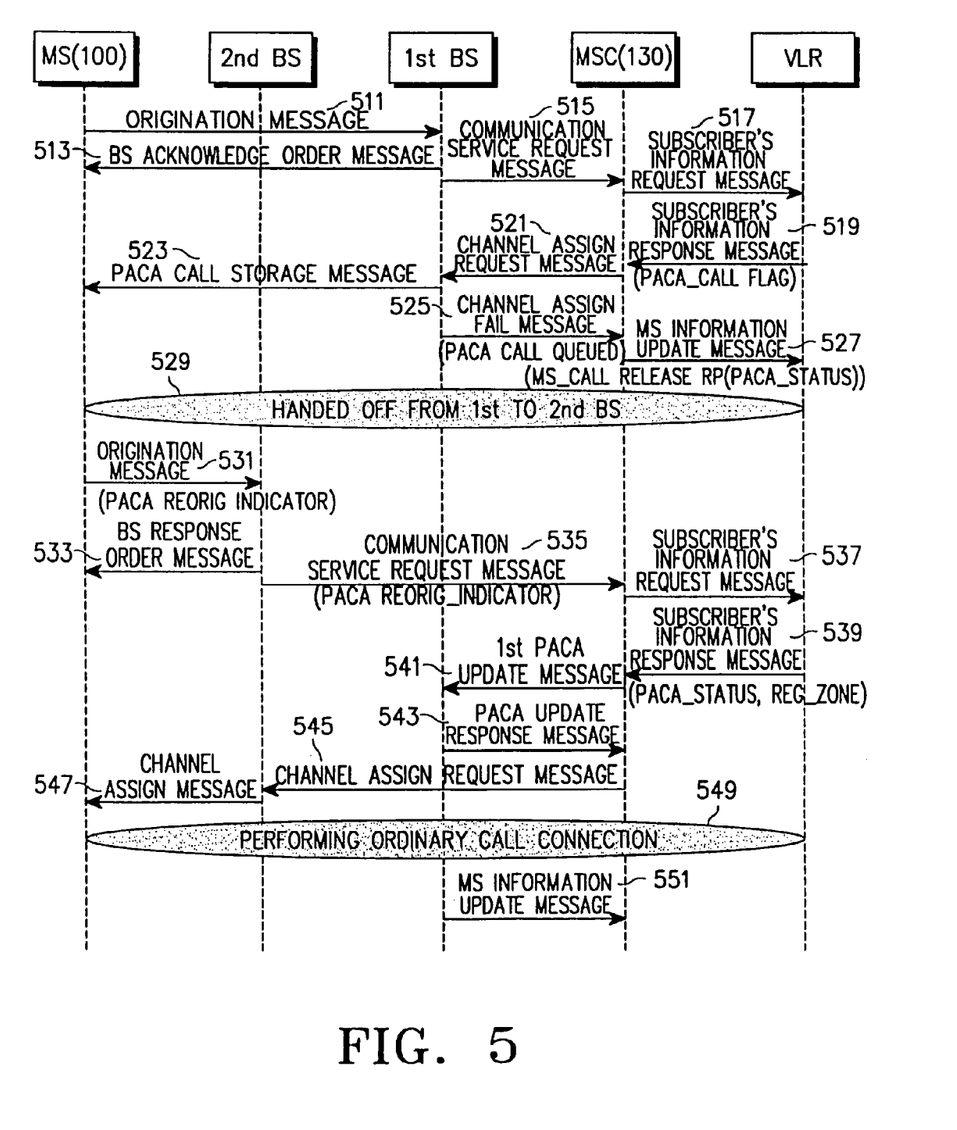
FIG. 5 illustrates a flow diagram that depicts handing off the PACA call, according to the present invention.

Referring to FIG. 5 there is a description of the process of dealing with the PACA call concerning the handoff of the MS 100 in connection with FIG. 5. The MS 100 sends the origination message to the first BS on request by the user, in step 511. Then, the first BS sends the BS acknowledge order message to the MS 100, in step 513, and the communication service request message to the MSC 130, in step 515. The MSC 130, sends, in step 517, the subscriber's information request message to HLR 140/VLR to retrieve the subscriber's information of the MS 100. The HLR/VLR loads the retrieved subscriber's information on the subscriber's information response message delivered to the MSC 130, in step 519. The subscriber's information response message, "PACA_Call_flag" is set to have a predetermined value, for example 1 if the MS has priority for the PACA call.

The MSC 130 receives the subscriber's information response message, then sends a channel assign request message to request the first BS 110 to assign a traffic channel to the MS, in step 521. The channel assign request message contains "queuing allowed" information to allow the PACA call, because the subscriber's information of the MS 100 represents priority for the PACA call. Then, the first BS 110 detects an available or idle traffic channel. If there is no idle traffic channel, the first BS determines that the MS 100 is in the PACA state "PACA_STATE," which indicates the storage of the origination message of the MS 100 as the PACA call in the PACA buffer. The PACA call is sent as a storage message that represents the address of the PACA call queue in the PACA buffer, for example "00000" to the MS 100, in step 523. In addition, the first BS sends the channel assign fail message to the MSC 130, in step 525. The channel assign fail message contains the PACA call queued information representing that the PACA state of the MS 100 has been stored in the PACA buffer of the BS 110. Subsequently, the MSC 130 receives the channel assign fail message, then sends the MS an information update message, "MS_CallReleaseRP PACA_STATE," to VLR to update the information of the MS. The MS information update message contains the information representing that the MS 100 has been shifted to the PACA state "PACA_STATE" stored in the PACA buffer.

Meanwhile, if the MS 100 is handed off from the previous BS (hereinafter referred to as "first BS") to another BS (hereinafter referred to as "second BS"), in step 529, it sends a new origination message containing the PACA reorigination indicator "PACA_REORIG" to the second BS, in step 531. Then, the second BS sends the BS acknowledge order message to the MS 100, in step 533, and the communication request message including the PACA reorigination indicator to the MSC 130, in step 535. The MSC 130, in turn, sends the subscriber's information request message to the VLR to provide the subscriber's information of the MS 100, in step 537. Then the VLR retrieves the subscriber's information loaded on the subscriber's information response message delivered to the MSC 130, in step 539. In this case, the subscriber's information response message includes both the status information of the MS 100 being in the PACA state and the location information of the MS 100 registered in the VLR.

Then the MSC 130 sends a first PACA update message to the first BS, in step 541. The first PACA update message is the message requesting the first BS to delete the PACA call stored in the PACA buffer of the first BS because the MS 100 has been handed off from the first to the second BS. Hence, the first BS sends the PACA update response message to the MS after deleting the PACA call from the PACA buffer, in step 543. Then, the MSC 130 sends the channel assign request message to the second BS to assign a traffic channel, in step 545. The second BS sends the channel assign message to notify the MS 100 that a traffic channel has been assigned to it, in step 547, so that the MS 100 performs an ordinary communication, in step 549. Terminating the communication, the MSC 130 sends the information update message of the MS to the VLR to delete the PACA state information of the MS 100, in step 551.

Figure 6:
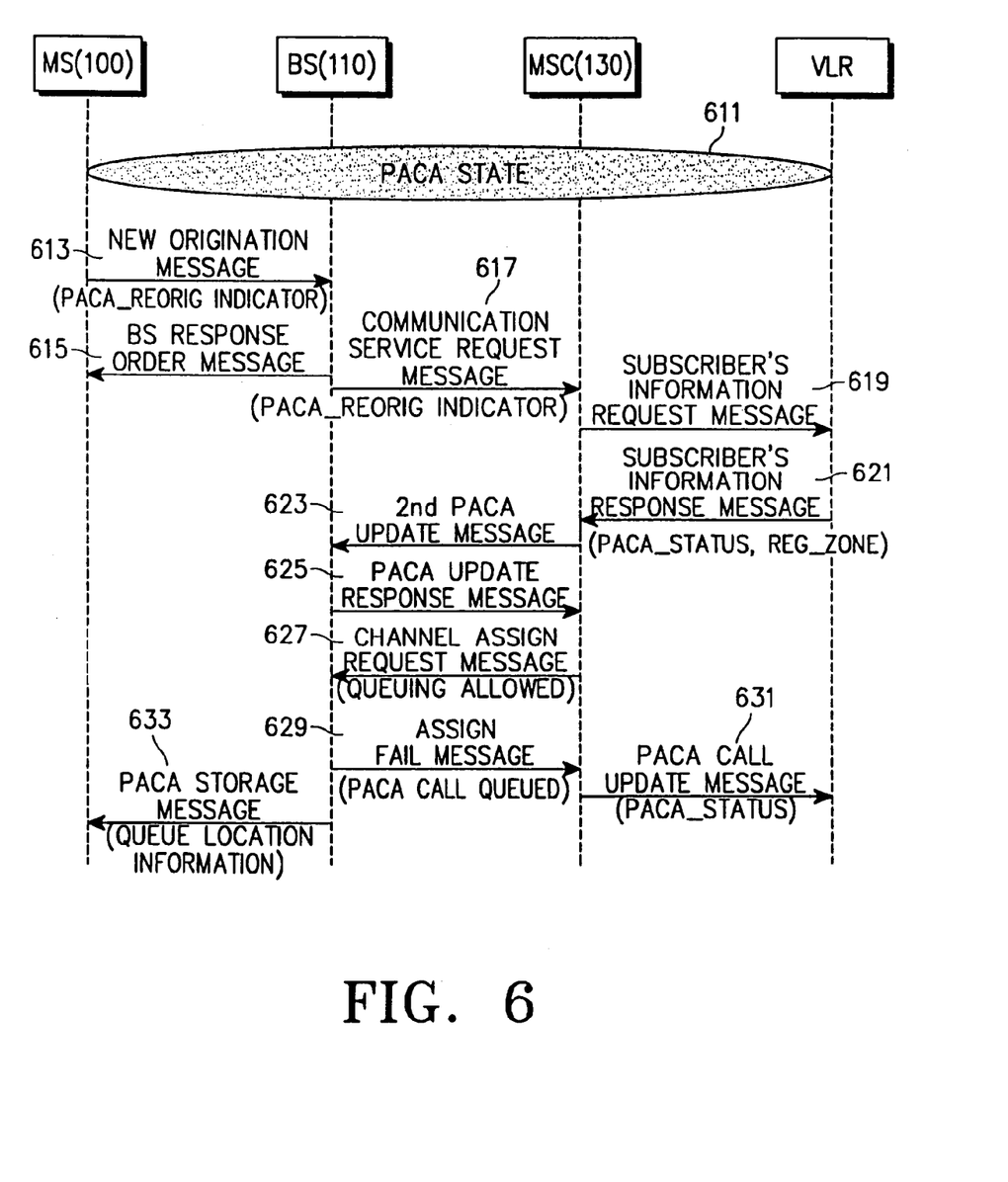
FIG. 6 illustrates a flow diagram that depicts sending a reorigination message for the PACA call.

Referring to FIG. 6, there is a description of the process of managing the PACA call when the MS 100 sends a new PACA call in the PACA state "PACA_STATE." If the MS 100, while being in the PACA state, in step 611, sends a new origination message containing the PACA reorigination indicator, "PACA_REORIG" to the BS 110, in step 613, then the BS 110 sends the BS response order message to the MS 100, in step 615. Then, the BS 110 sends the communication service request message containing the, "PACA_REORIG" indicator to the MSC 130, in step 617, so that the MSC 130 sends, in step 619, the subscriber's information request message to the VLR to obtain the subscriber's information. The VLR retrieves the requested subscriber's information loaded on the subscriber's information response message delivered to the MSC, in step 621. In this case, the subscriber's information response message includes both the status information of the MS 100 being in the PACA state and the location information of the MS 100 registered in the VLR.

Then the MSC 130 sends a second PACA update message to the BS 110, in step 623. The second PACA update message is the message requesting the BS to delete the previous PACA call stored in the PACA buffer of the BS because the MS 100 has sent the new origination message requesting again the PACA call. Hence, the BS 110 sends the PACA update response message to the MS 130 after deleting the previous PACA call from the PACA buffer, in step 625. Then, the MSC 130 sends the channel assign request message to the BS 110 to assign a traffic channel, in step 627. Then, the BS 110 detects an available traffic channel to assign to the MS. If BS 110 does not detect an available traffic channel, then the BS 110 stores the PACA call into the PACA buffer, sending, in step 629, the channel assign fail message containing the PACA call queued information to the MSC 130. The MSC 130 sends the PACA call update message to the VLR to update the PACA state of the MS 100, in step 631. In addition, the BS 110 sends the PACA storage message containing the PACA call state representing the storage location of the PACA call in the PACA buffer to the MS 100, in step 633.

Figure 7:
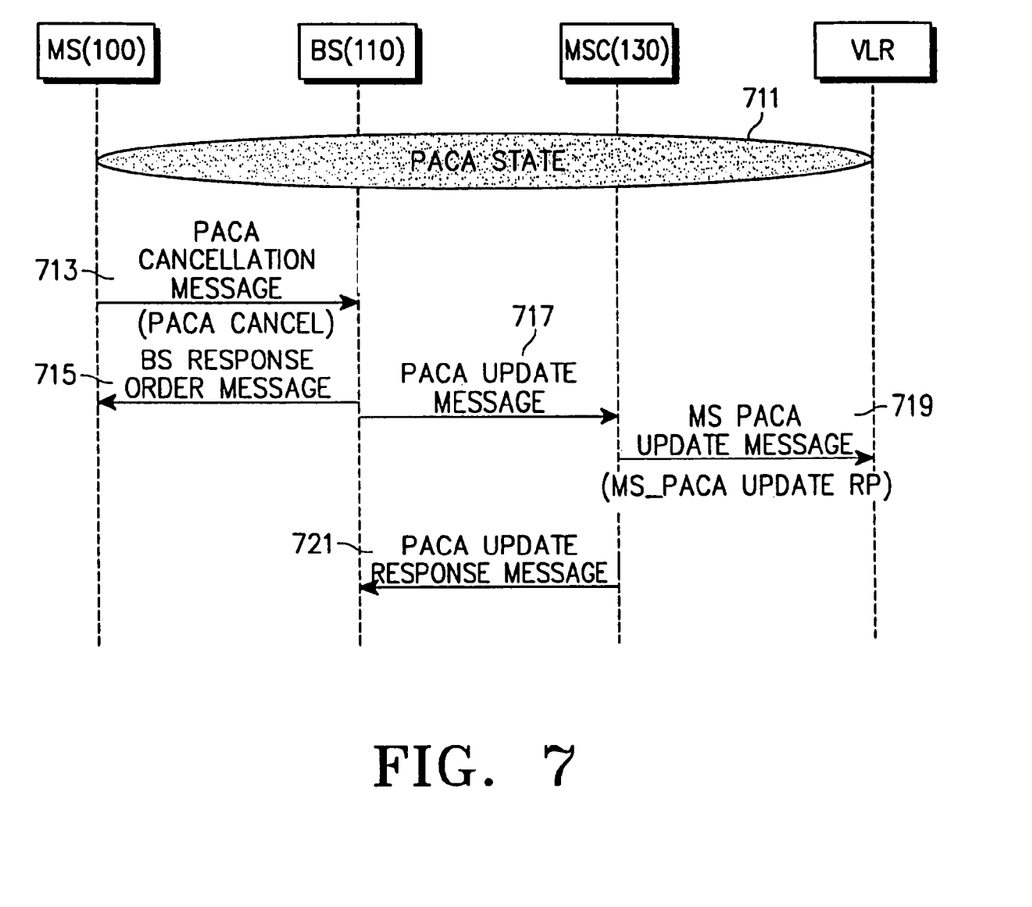
FIG. 7 illustrates a flow diagram that depicts canceling the PACA call, according to the present invention.
Figure 8:
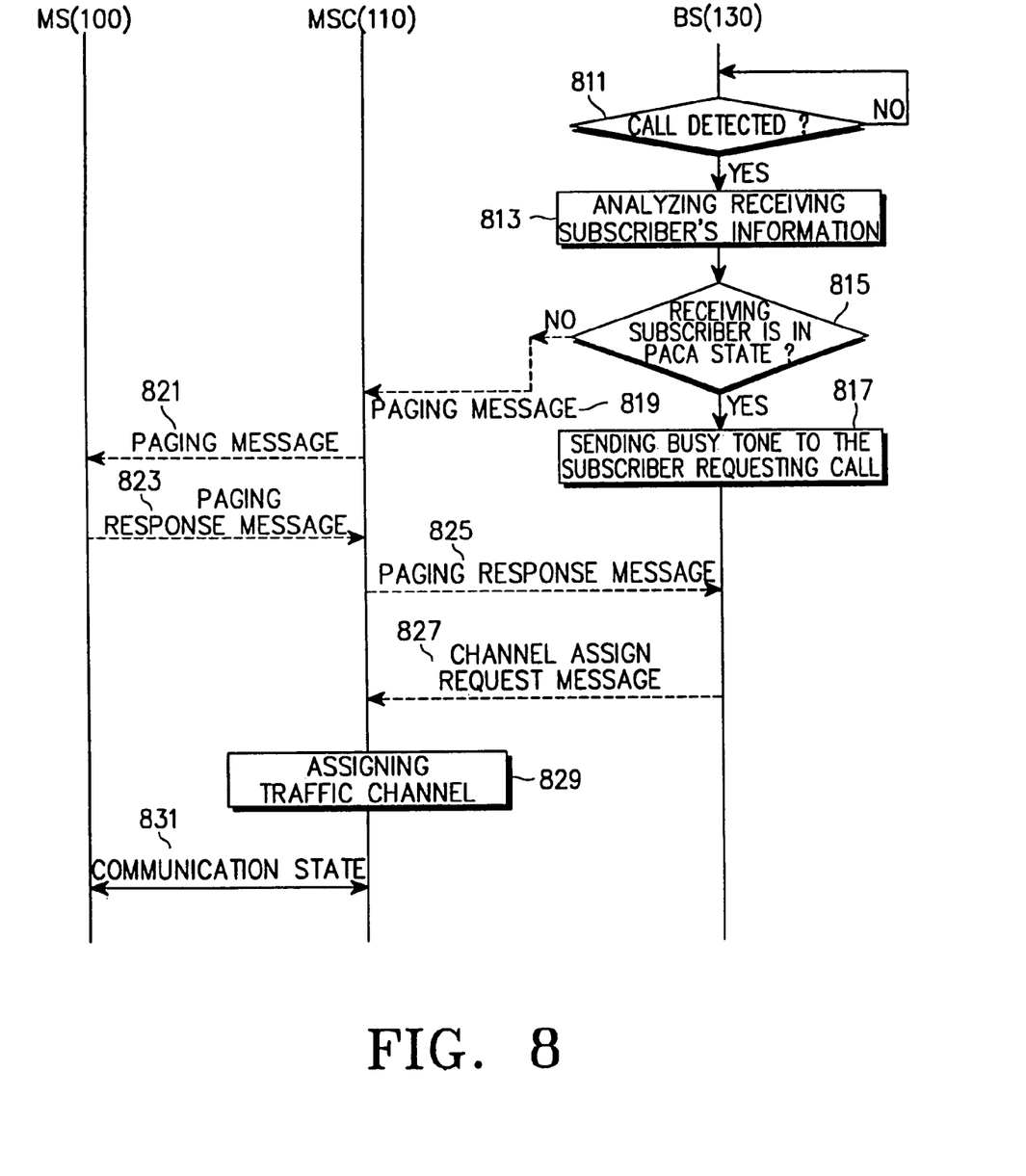
FIG. 8 illustrates a flow diagram that depicts controlling a call signal directed toward the MS in the PACA state, according to the present invention.

Describing the process of canceling the PACA call in connection with FIG. 7, the MS 100 detects the PACA call cancellation entered by the user in step 711. If MS 100 detects the PACA call cancellation entered by the user, then the MS sends the PACA cancellation message to the BS 110 in step 713, so that the BS 110 sends the BS response order message to the MS 100, in step 715, which deletes the PACA call from the PACA buffer. The PACA update message, indicates that the MS 100 has been released from the PACA state to the MSC 130, in step 717. Then, the MSC 130 sends, in step 719, the MS PACA update message "MS_PACAUpdateRP," indicates that the MS 100 has been released from the PACA state to the VLR, and the PACA update response message to the BS 110, in step 721. Of course, the PACA call may also be cancelled by the BS 110. Referring to FIG. 8, there is a description of the process of warding off a call from the MS in the PACA state in connection with FIG. 8. The MSC 130 retrieves the receiving subscriber's information of the call detected, in step 811, to analyze it, in step 813, thereby determining, in step 815, whether the receiving subscriber is in the PACA state or not. If the receiving subscriber is in the PACA state, the MS 130 sends the busy tone to the subscriber requesting the call, in step 817. Alternatively, if the receiving subscriber is not in the PACA state, the MSC 130 sends a paging message to the BS 110 registering the receiving subscriber, in step 819, which in turn transfers it to the MS 100, in step 821. Then, the MS 100 sends the paging response message to the BS 110 in step 823, which in turn transfers it to the MSC 130, in step 825. Then, the MSC 130 sends the channel assign request message to the BS 110, in step 827, so that the BS 110 assigns, in step 829, a traffic channel to the MS 100 shifted to the communication stated, in step 831.

Thus, the present invention provides a mobile telecommunication system with means to distinguish the PACA call from the ordinary call in charging the communications services. In addition, the present invention deletes the PACA call information from the BS when the MS is handed off to a new BS or when the MS in the PACA state. Then, the present invention sends a new origination signal or when the MS BS cancels the PACA call, thereby improving the storage efficiency of the PACA buffer. Further, the present invention sends the busy tone signal to a caller who has sent a call signal to the MS in the PACA state without requesting the MS to receive it.

While the present invention has been described in connection with specific embodiments accompanied by the attached drawings, it will be readily apparent to those skilled in the art that various changes and modifications may be made thereto without departing from the gist of the present invention.

What is claimed is:

1. A method for controlling a Priority Access and Channel Assignment (PACA) call in a mobile telecommunication system, the method comprising:
    analyzing, by the system, information of a receiving subscriber which an incoming call signal is directed from a sending subscriber;
    determining, by the system, whether the receiving subscriber is in a PACA state;
    canceling, by the system, the incoming call signal from the sending subscriber to a mobile station of the receiving subscriber when the receiving subscriber is in a PACA state; and
    sending, by the system, a busy tone to the sending subscriber who has generated the incoming call signal.

2. A method for controlling a Priority Access and Channel Assignment (PACA) call in a mobile telecommunication system, the method comprising:
    analyzing, by the system, information of a receiving subscriber which an incoming call signal is directed from a sending subscriber;
    determining, by the system, whether the receiving subscriber is in a PACA state;
    canceling, by the system, the incoming call signal from the sending subscriber to a mobile station of the receiving subscriber when the receiving subscriber is in a PACA state; and
    sending a paging message to the mobile station of the receiving subscriber when the mobile station is not in the PACA state.

* * * * *